(12) United States Patent
Taylor

(10) Patent No.: US 9,462,092 B2
(45) Date of Patent: Oct. 4, 2016

(54) SMARTER BUSINESS THINKING MOBILE DEVICE

(71) Applicant: Mark P. Taylor, Eight Mile Plains (AU)

(72) Inventor: Mark P. Taylor, Eight Mile Plains (AU)

( * ) Notice: Subject to any disclaimer, the term of this patent is extended or adjusted under 35 U.S.C. 154(b) by 0 days.

(21) Appl. No.: 14/395,171

(22) PCT Filed: Apr. 18, 2013

(86) PCT No.: PCT/AU2013/000409
§ 371 (c)(1),
(2) Date: Oct. 17, 2014

(87) PCT Pub. No.: WO2013/155569
PCT Pub. Date: Oct. 24, 2013

(65) Prior Publication Data
US 2015/0092619 A1  Apr. 2, 2015

(30) Foreign Application Priority Data

Apr. 19, 2012 (AU) ............................... 2012901538

(51) Int. Cl.
| H04M 11/04 | (2006.01) |
|---|---|
| H04M 7/00 | (2006.01) |
| H04L 12/54 | (2013.01) |
| H04M 1/02 | (2006.01) |
| H04L 12/64 | (2006.01) |
| H04M 1/725 | (2006.01) |

(52) U.S. Cl.
CPC ........ *H04M 1/0202* (2013.01); *H04L 12/5691* (2013.01); *H04L 12/6418* (2013.01); *H04M 1/72536* (2013.01); *H04M 7/0081* (2013.01); *H04M 11/04* (2013.01); *H04M 2242/04* (2013.01)

(58) Field of Classification Search
CPC ........................ H04M 7/0081; H04L 12/5691
See application file for complete search history.

(56) References Cited

U.S. PATENT DOCUMENTS

| 2002/0019966 A1 | 2/2002 | Yagil et al. |
| 2002/0034960 A1* | 3/2002 | Muranaga ..................... 455/517 |
| 2004/0179541 A1 | 9/2004 | Godwin et al. |
| 2005/0141487 A1 | 6/2005 | Mansfield et al. |
| 2007/0263641 A1* | 11/2007 | Yee .............................. 370/401 |
| 2010/0324884 A1* | 12/2010 | Jeffrey .............................. 704/2 |
| 2011/0140911 A1* | 6/2011 | Pant et al. ............... 340/870.02 |

FOREIGN PATENT DOCUMENTS

AU   WO2013/155569 A1   10/2013

OTHER PUBLICATIONS

Author Unknown, Is it possible to be your own ISP?, pp. 1-7, Jul. 2007.*

* cited by examiner

*Primary Examiner* — Christopher Crutchfield
(74) *Attorney, Agent, or Firm* — Jill A. Jacobson

(57) ABSTRACT

The present invention relates to providing a device for use in corporate systems and methods thereof, and during emergency situations.

6 Claims, 3 Drawing Sheets

Dual Screen

SMARTER BUSINESS THINKING MOBILE DEVICE

CROSS-REFERENCE TO RELATED APPLICATIONS

This application is a U.S. national stage application under 35 U.S.C. §371 of PCT/AU2013/000409, filed on Apr. 18, 2013 and published as WO2013/155569 on Oct. 24, 2013, which claims priority to Australian application no. 2012901538, filed on Apr. 19, 2012.

FIELD OF THE INVENTION

The present invention relates to providing a device for use in corporate systems and during emergency situations, and methods thereof.

BACKGROUND OF THE INVENTION

The use of the internet provides a means of communication unparalleled in history. In order to communicate with the third party via the internet an internet connection is necessary. The connection is usually provided by an Internet Service Provider (ISP). Most ISPs require subscription to the service by the user to enable use of the internet service.

There are some services such as VOIP (Voice Over IP) which provide free service to users. There are other systems, particularly in the gaming technology whereby players may interact with each other or as a group without the use of or connecting to the internet. Furthermore, recent developments include the use of the personal ISP connection.

However, there are limitations to these services because the setting up of personal ISPs is not user friendly.

It is desirable to provide a system and method by which people can access internet-based information without directly using a computer, having a personal ISP connection, or gaining experience or training on use of the Internet.

It is desirable to provide a system and method by which people can gain quick and accurate voice access to Internet-based information free of charge.

SUMMARY OF THE INVENTION

The present invention provides a device for accessing and exchanging information such as data without the use of an external Internet service provider (ISP) wherein the device enables a user to hook phone lines to a computer without the need of using the external phone line system.

In another aspect, the invention provides a system for accessing and exchanging information such as data without the use of an external internet service provider (ISP) wherein the device enables a user to hook phone lines to a computer without the need of using an external phone line system.

Preferably, the system allows the user to build his/her own personal ISP.

In another aspect, the present invention provides a method for accessing and exchanging information such as data using a device or system according to the present invention.

Preferably, the system or device according to the present invention further comprises:
a Card reader, eg Translink QLD Driver licenses, Blue Card, Weapons, Photo scanner; Breath Analyser; Fingerprint Reader; Distress/duress button;
Emergency contact button (fire, police, ambulance); USB-3 port-; and
Infra red illumination—fingerprint photo.

In another aspect, the present invention provides a method for accessing emergency information by a traveler comprising the steps of:
(i) Storing of emergency contacts (eg, name and contact details such as mobile number, etc);
(ii) Setting up of emergency contact details of emergency services in different countries; and
(iii) Translating of words spoken in one language to a desired foreign language.

Preferably, the method according to present invention uses the system or device according to the instant invention.

Preferably, the device includes a means for detection during emergency situations.

Preferably, the device further comprises thermal imaging capabilities for detection during emergency situations of accident victims or lost people.

Preferably, the device acts as a two way radio on one physical channel.

Preferably, the device further comprises an infra red searchlight.

DETAILED DESCRIPTION OF THE INVENTION

The present invention relates to providing a Smart Business Thinking Device and methods thereof. In particular, the invention relates to a device or system for accessing and exchanging information such as data without the use of an external Internet service provider (ISP). The device or system would be particularly suitable for use in organizations which may set up an in house network system.

Another aspect of the invention relates to a multi-function device including various capabilities or functions such as ability to be used as a Breath analyser to determine alcohol or drug level, and ability to read finger prints.

The present invention provides a system to enable the user to hook phone lines to a computer without the need of using the external phone line system. The system allows the user to build his/her own personal ISP. The system would link to an existing phone line. The only cost would be charges based on the single phone line. The user may put any compatible device on the system.

Companies would be able issue their own phone numbers, sim card, ds cards, etc.

The user may assign other phone numbers to other users without incurring further cost to the company. Thus, all internal calls would be free of charge.

The system utilises functions of the standard Communication Manager and Communication Software.

Figure 1:
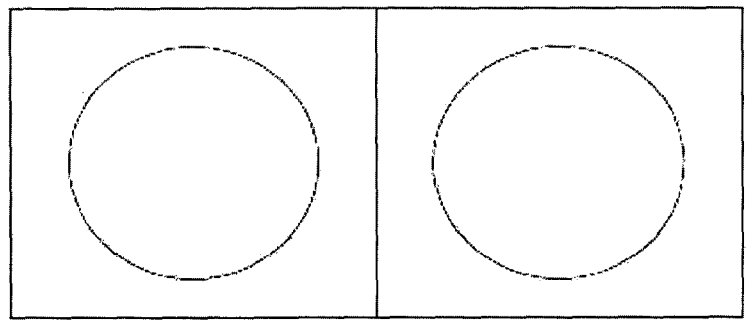
FIG. 1 shows a dual screen device as an embodiment of the present invention
Figure 1:
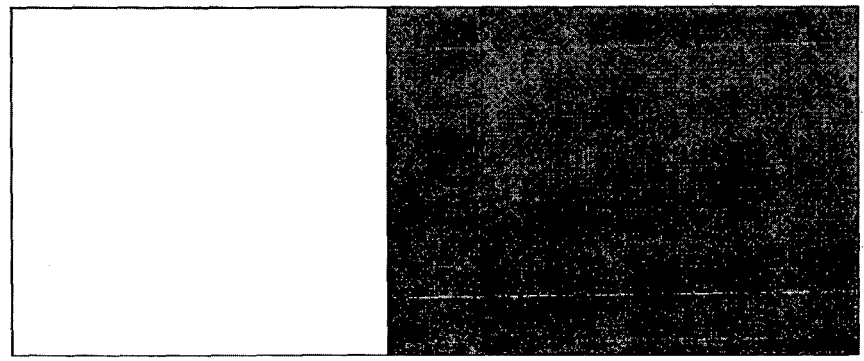

FIG. 1 shows a dual screen device as an embodiment of the present invention.

Figure 2:
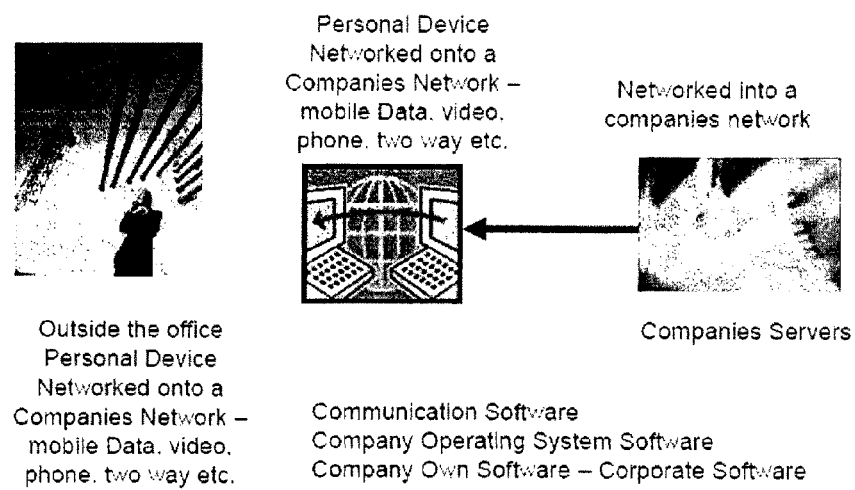
FIG. 2 shows a network device as an embodiment of the present invention

FIG. 2 shows a network device and system as an embodiment of the present invention.

Figure 3:
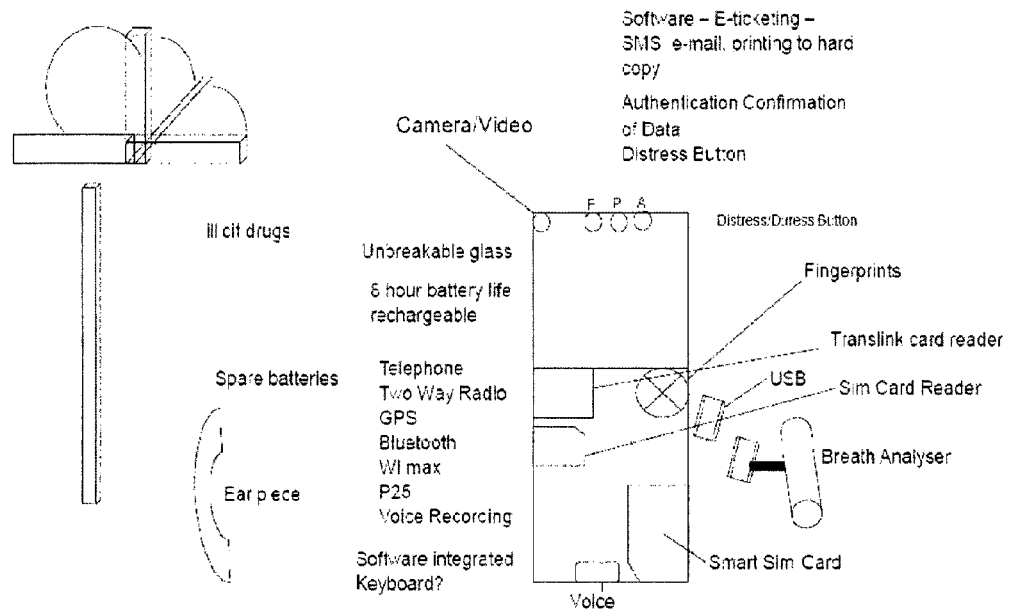
FIG. 3 shows the device as an embodiment of the present invention.

FIG. 3 shows the device as an embodiment of the present invention. The features of the device include the ability to contact emergency numbers instantly by means of pressing of a single button or similar interactive component on the device; ability to store and contact persons via a distress/ duress button; ability to read fingerprints; ability to store and read cards such as transport (road, rail, ferry) cards; ability to recognise and identify voice, etc.

In another aspect, the invention provides a system for use by a traveler permitting:
(i) Storage of emergency contacts (eg, name and contact details such as mobile number, etc);
(ii) Setting up of emergency contact details of emergency services in different countries;
(iii) Translation of words spoken in one language to a desired foreign language.

In relation to item (iii) above, the device such as a phone using the system may be programmed to recognise individual voices. So the device may be programmed for personal use. This program would enable the device to translate spoken words into another language based on the user's voice.

If the user goes outside, the system could be used by connection to the NBN system which is presently being trialled in Australia.

Mobile device—Blank device without an Operating System (OS) to allow an organization to develop a corporate operating system for its personnel. To avoid potential installation incompatibilities and invalid drivers a generic chip set will allow Windows 7 or another OS to be installed. Smarter Business Thinking will be able to customise the software and OS build for specific models. Processor that allows for voice, data in and voice, data out simultaneously, also be a two-way radio and mobile phone, with priority voice-over for urgent radio transmissions.

Hardware—Peripherals

The present invention supports a wide range of applications including:
Voice recording for interviews—feedback to a central data warehouse;
Camera—feedback to a central data warehouse'
GPS—CAD system;
Bluetooth;
Wi Max;
Video recorder/player;
Card reader—Translink, QLD Driver licenses, Blue Card, Weapons, Photo scanner;
Breath Analyser;
Fingerprint Reader'
USB-3 port-; and Infra red illumination—fingerprint photo.

Software

The present invention operates on systems and software known and used in the art including:
Fingerprint—recognition software;
Photographic—recognition software;
HTML 5—browser;
C#—applications;
SQL—data bases within a Web Browser;
Java—applications;
Microsoft Office—mobile version;
Air print—Solution;
Communication Mobile VoIP and VoIP—program, for example Cisco;
Communication manager;
E-Ticketing software—For example sending a speed ticket to an email address, mobile phone, police central data warehouse, transport department;
SMS;
Email;
Wireless printing;
Sync with desktop and transfer profile from device to device; and
Video—Gateway into CCTV P25—Communications Standard The P25 communication system is the current standard for distress calls. The device according to the present invention can withstand extreme conditions including:
Fire—
30 minutes under water—rain
Dropped repeatedly on the ground
Thus, the device is intrinsically safe and robust to use during an emergency situation.
Two-Way Radio
The device needs to carry a digital trunked system with simultaneous conversations on one physical channel. In the case of a digital trunked radio system, the system also needs to manage time slots on a single physical channel.

Systems make arrangements for handshaking and connections between devices by one of these two methods:
A computer assigns channels over a dedicated control channel. The control channel sends a continual data stream. All devices in the system to monitor voice and data stream until commanded by the device to join a conversation on an assigned channel.
Electronics embedded in each device communicate using a protocol of voice or data in order to establish a conversation, (system-based).
Thermal Imaging
Thermal cameras that detect heat signatures have become invaluable for the safe location of accident victims and arrest of fleeing criminals.
Thermal Scanning allows the device to visualise and quantify changes in the surface temperature of electrical, body temperature. An infrared camera converts infrared radiation (heat) emitted from the surface/body of electrical equipment into electrical impulses. These impulses are mapped as colours which represent the various temperatures. Thermal Imaging identifies equipment flaws and pinpoints any hot spots often invisible to the naked eye.

Quad processor—designed to handle massive computer and visualization workloads enabled by powerful multi-core technology.

infrared searchlight (¦ infr¦ red srchlt) (optics) A device for illuminating a scene with infrared radio.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The claims defining the invention are as follows:
1. A device for accessing and exchanging information such as data without the use of an external internet service provider (ISP) wherein the device enables a user to hook phone lines to a computer without the need of using the external phone line system, wherein the device further comprises:
 a Card reader; Breath Analyser; Fingerprint Reader; Distress/duress button;
 Emergency contact button; three USB ports; and
 Infra red illumination—fingerprint photo.

2. A method for accessing emergency information by a traveler comprising the steps of:
 (i) Storing emergency contacts;
 (ii) Setting up emergency contact details of emergency services in different countries; and
 (iii) Translating words spoken in one language to a desired foreign language,
 wherein the method comprises using a system or device for accessing and exchanging information such as data without the use of an external internet service provider (ISP) wherein the system or device enables a user to hook phone lines to a computer without the need of using an external phone line system, and wherein the system or device includes a means for detection during emergency situations.

3. The method according to claim 2, wherein the system or device further comprises thermal imaging capabilities for detection during emergency situations of accident victims or lost people.

4. The method according to claim 3 wherein the system or device acts as a two way radio on one physical channel.

5. The method according to claim 2, wherein the system or device further comprises an infra red searchlight.

6. A computer program executed on a processor for accessing and exchanging information such as data without the use of an external internet service provider (ISP) wherein the device enables a user to hook phone lines to a computer without the need of using an external phone line system, comprising:
 a Card reader; Breath Analyser; Fingerprint Reader; Distress/duress button;
 Emergency contact button; three USB ports; and
 Infra red illumination—fingerprint photo.

* * * * *